United States Patent [19]

Marino et al.

[11] Patent Number: 5,214,529
[45] Date of Patent: May 25, 1993

[54] ASSEMBLY FOR STATIC AND DYNAMIC POSITIONAL CONTROL OF AN OPTICAL ELEMENT

[75] Inventors: Philip F. Marino, Rochester; Andrew J. Kalish, Brockport; Phillip Vallone, Rochester, all of N.Y.

[73] Assignee: Eastman Kodak Company, Rochester, N.Y.

[21] Appl. No.: 890,411

[22] Filed: May 29, 1992

[51] Int. Cl.⁵ .................................. G02B 26/10
[52] U.S. Cl. ........................... 359/213; 359/224
[58] Field of Search ............ 359/196, 212, 213, 214, 359/223, 224; 250/347, 348, 353

[56] References Cited

U.S. PATENT DOCUMENTS

| 4,056,309 | 11/1977 | Harbison et al. | 350/607 |
| 4,090,781 | 5/1978 | Godot et al. | 359/226 |
| 4,655,563 | 4/1987 | Plante et al. | 350/611 |
| 4,725,144 | 2/1988 | Nelson et al. | 350/607 |
| 4,778,233 | 10/1988 | Christenson et al. | 359/223 |
| 4,875,764 | 10/1989 | Marino et al. | 350/611 |
| 4,875,765 | 10/1989 | Vandenberg et al. | 350/611 |
| 4,959,531 | 9/1990 | Marino | 250/201.9 |
| 4,973,145 | 11/1990 | Kirkwood et al. | 350/487 |
| 5,079,641 | 7/1992 | Marino et al. | 359/224 |

*Primary Examiner*—Bruce Y. Arnold
*Assistant Examiner*—J. P. Ryan
*Attorney, Agent, or Firm*—Stephen C. Kaufman

[57] ABSTRACT

An assembly suitable for statically and dynamically controlling an optical element, for example, a secondary mirror. The assembly realizes a novel design technique which treats the problems of static and dynamic control of the optical element, as subsumed moments of one interdependent problem. The one interdependent problem may be solved by way of a single structural design, featuring a unique lever arm, which can provide overlapping functions responsive, at one and the same time, to both moments.

20 Claims, 2 Drawing Sheets

ASSEMBLY FOR STATIC AND DYNAMIC POSITIONAL CONTROL OF AN OPTICAL ELEMENT

BACKGROUND OF THE INVENTION

1. Field of the Invention

This invention relates to an assembly suitable for statically and dynamically controlling the positioning of an optical element.

2. Introduction to the Invention

Our work concerns the problems of statically and dynamically controlling the positioning of an optical element. In particular, our optical element typically is part of an optical system, of the type shown in FIG. 1.

FIG. 1 shows an optical system 10. The optical system 10 comprises a support structure 12, and a primary mirror 14 positioned on the support structure 12. The optical system 10 also includes an optical element comprising a secondary mirror 16. The secondary mirror 16 may be connected to the support structure 12 by way of a set of conventional flexure struts 18.

SUMMARY OF THE INVENTION

Our work, in particular, concerns the problems of statically and dynamically controlling the positioning of an optical element, such as the secondary mirror 16 shown in FIG. 1.

By statically controlling the position of the optical element, we mean fixing a desired static spatial position of an optical element in six degrees of freedom. This is the position, established in six degrees of freedom according to predetermined desired positional specifications, that is to be maintained over the long term by the optical element, independent of short-term transient shifts caused by extraneous perturbations to the optical system.

By dynamically controlling the position of the optical element, we mean accommodating transient, spurious, and extraneous vibratory perturbations to the optical system, as well as known, predetermined perturbations to the optical system, to the end of preventing the perturbations from upsetting the established static positioning of the optical element, within a given time frame.

We have recognized that, heretofore, the problems of statically and dynamically controlling the positioning of an optical element such as the secondary mirror 16 shown in FIG. 1, have been understood as dual, or independent, problems. Accordingly, workers skilled in this art have developed independent approaches, techniques, and structural solutions, for independently accommodating the static and dynamic positional control of the optical element.

We have theorized that one reason for this independence of approach may be the following. In order to realize static control, there is a tendency to use structures in the design of the optical system that are rigid and stiff. It is thought that rigid and stiff structures best fix the desired position of the optical element and, therefore, provide the best static positional control. In order to realize dynamical positional control, on the other hand, there is a tendency to use structures in the design of the optical system that are not rigid and stiff, and therefore can more readily control and dampen vibratory perturbations incurred by the optical system.

Putting these two design objectives together, it may have been thought that, since the two problems of static and dynamic positional control may require different, indeed, antagonistic structural solutions, it is preferred to continue to treat them as separate, independent problems.

We have recognized, however, that to treat and attempt to solve the two problems of static and dynamic positional control, independently, may lead to unnecessary optical system design redundancies and lead as well to possible losses in design efficiencies, while creating undue system response times to perturbations.

We have now discovered a novel design technique which treats the problems of static and dynamical positional control as subsumed moments of one problem. The one interdependent problem can be accommodated by a single structural design which provides overlapping functions. In this way, our novel design technique realizes important advantages over the prior art, including elimination of structural redundancies, and streamlined efficiencies.

The novel design technique may be realized in a novel assembly of the present invention. In a first aspect, we disclose a novel assembly comprising:

a) an optical element;
b) a lever arm having an effective spring stiffness relative to the optical element of at least $2.0 \times 10^4$ pounds/inch, but less than $2.0 \times 10^6$ pounds/inch;
c) a flexure means for connecting the lever arm to the optical element;
d) a static position actuator for positioning the lever arm, thereby positioning the optical element by way of the flexure means;
e) a dynamic force actuator for applying active damping forces to the lever arm, thereby, by way of the flexure means, dampening perturbations to the optical element;
f) a sensor adapted and positioned for detecting perturbations to the optical element; and
g) computing means responsive to the perturbations detected by the sensor, for computing compensatory active damping forces for control of the dynamic force actuator.

In a second aspect, we disclose an assembly of an optical system, comprising:

a) an optical element;
b) a support including a fulcrum;
c) a lever arm supported on the support and balanced by way of the fulcrum;
d) a flexure means for connecting the optical element to the lever arm at a first point spaced from the fulcrum;
e) a static position actuator, acting on the lever arm at a second point spaced from the fulcrum, for positioning the lever arm to thereby position the optical element by way of the flexure means;
f) a sensor adapted and positioned for detecting positional perturbations experienced by the optical element;
g) a dynamic force actuator, cooperative with the sensor and acting on the lever arm at a third point spaced from the fulcrum and located intermediate the first and second points, for applying active damping forces to the lever arm in response to perturbations detected by the sensor, to thereby, by way of the flexure means, dampen perturbations to the optical element; and
h) a sensor and computing means responsive to perturbations to the optical element, and computing compensatory active damping forces for input to the dynamic force actuator.

In a third aspect, we disclose an assembly for the positional control of an optical element of an optical system; the assembly having a support including a fulcrum, a lever arm supported and balanced by way of the fulcrum, flexure means connecting the optical element of the lever arm at a first point spaced a first distance from the fulcrum, a static position actuator acting on the lever arm at a second point spaced a second distance from the fulcrum, the static position actuator cooperating with the flexure means and lever arm to establish a static spatial position of the optical element over the long term relative to the support, and the assembly further comprising means for dynamically controlling the position of the optical element relative to its established static spatial position to accommodate perturbations to the optical system so as to maintain the established static spatial position over the short term; the improvement comprising:

the assembly further including a sensor adapted and positioned for detecting positional perturbations experienced by the optical element;

the means for dynamically controlling the position of the optical element comprising at least one actuator cooperative with the sensor for applying, in response to the perturbations detected by the sensor, forces to the lever arm at a third point intermediate the first and second points and spaced a third distance from the fulcrum; and the lever arm being dimensioned, configured and adapted so that positioning of the optical element relative to the structure at any one time will be controlled, at least in part, by the combined moment effect on the first point of the static position actuator acting at the second point and the means for dynamically controlling the position acting at the third point.

In a fourth aspect, we disclose an assembly for the positional control of an optical element of an optical system, comprising:

a support including a fulcrum;

a lever arm supported on the support and balanced by way of the fulcrum;

a first flexure connecting the optical element to the lever arm at a first point spaced a first distance from the fulcrum;

a static position actuator;

a second flexure connecting the static position actuator to the lever arm at a second point spaced a second distance from the fulcrum; the static position actuator cooperating with the flexures and lever arm to establish a static spatial position of the optical element over the long term relative to the support;

a sensor adapted and positioned for detecting positional perturbations experienced by the optical element; and a dynamic positional control actuator connected to the sensor and adapted and positioned for applying forces, in response to the perturbations detected by the sensor, to the lever arm at a third point intermediate the first and second points and spaced a third distance from the fulcrum;

the lever arm being configured so that positioning of the optical element relative to the structure at any one time will be controlled, at least in part, by the combined moment effect on the first point of the static position actuator acting at the second point and the dynamic positional control actuator acting at the point.

BRIEF DESCRIPTION OF THE DRAWINGS

The invention is illustrated in the accompanying drawings, in which.

and

Figure 1:
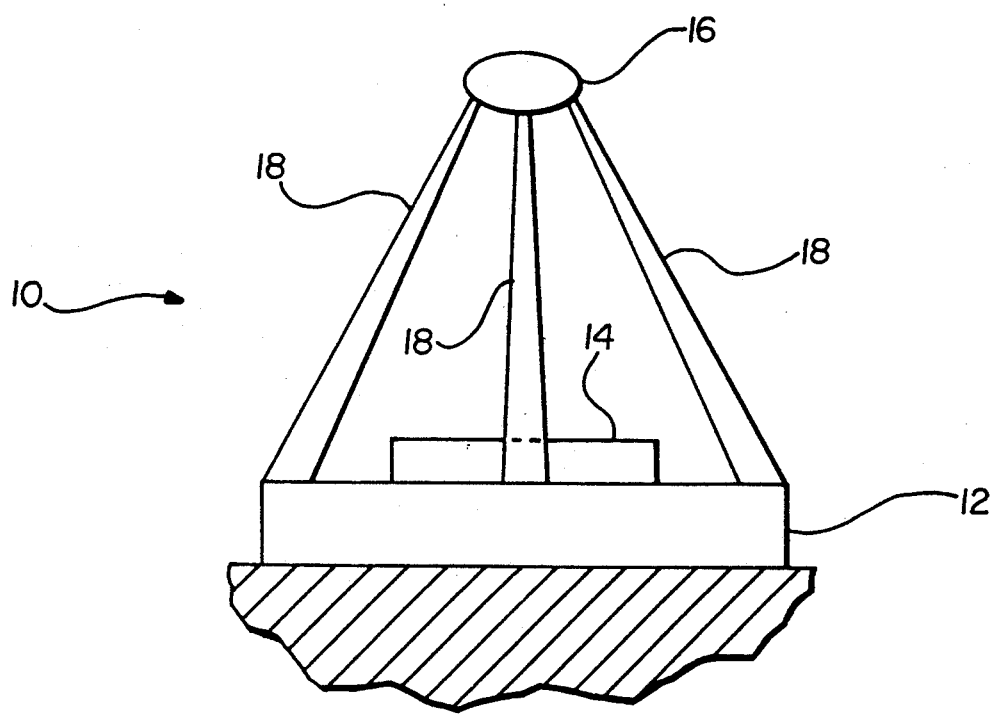
FIG. 1 (prior art) shows an optical system that provides background information for the present invention.
Figure 2:
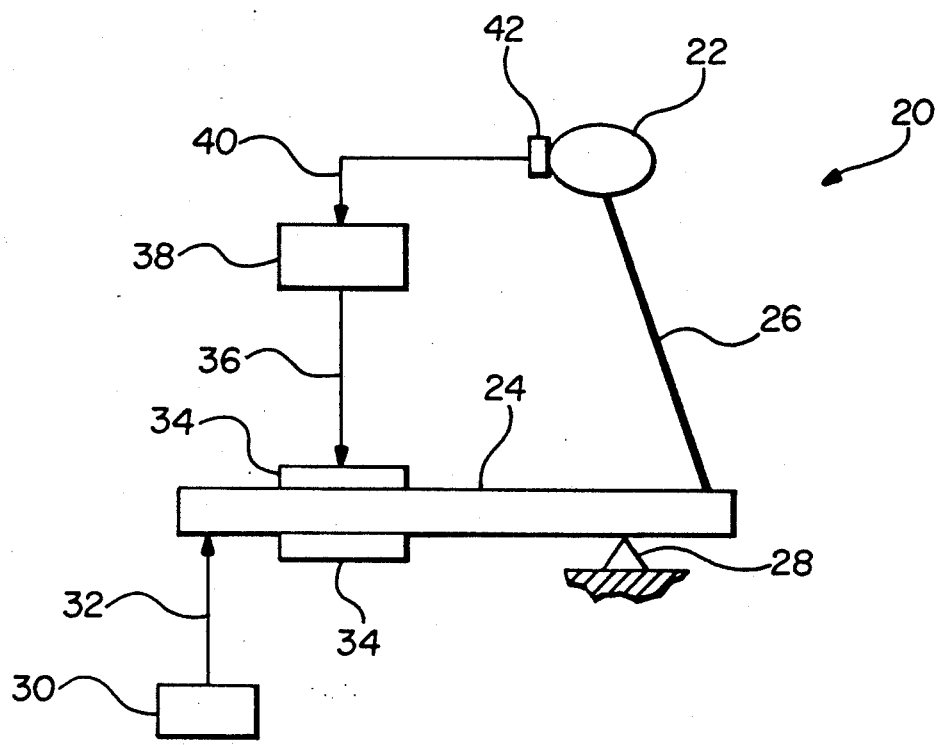
FIG. 2 shows a preferred assembly of the present invention.
Figure 3:
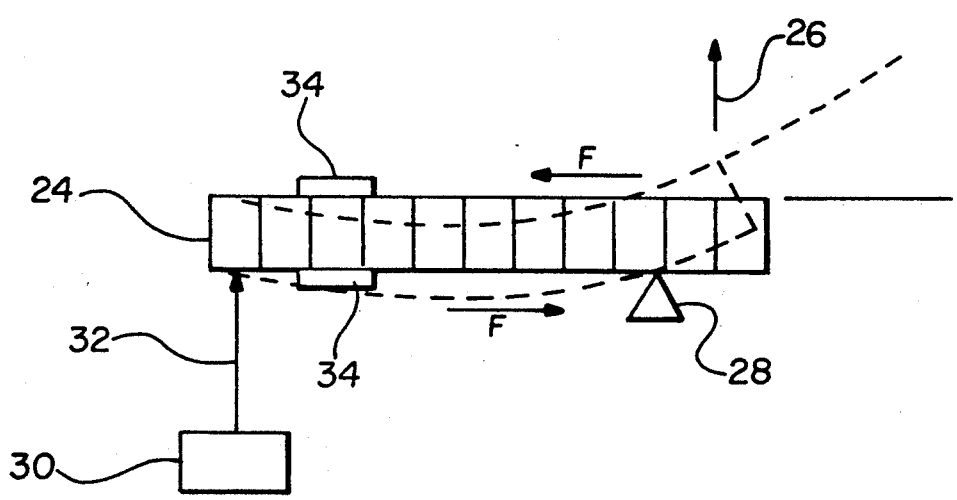

FIG. 3 shows a lever arm of the assembly of FIG. 2 during operation of the assembly for dynamic control of positioning.

DETAILED DESCRIPTION OF THE INVENTION

Attention is now directed to FIG. 2, which shows a preferred, canonical assembly 20 of the present invention. In overview, the FIG. 2 assembly 20 includes the following components.

An optical element comprising a secondary mirror 22 is connected to a lever arm 24, by way of a strut flexure 26. The lever arm 24, in turn, is supported and balanced, in a conventional manner, by way of a fulcrum 28.

A conventional static position actuator 30 provides an input to the lever arm 24, by way of an actuator flexure 32. A pair of dynamic force actuators 34, connected to the lever arm 24, provide active damping forces to the lever arm 24.

An instruction command to the dynamic force actuator 34 is conveyed along a line 36 from a computing means 38, for example, a conventional array processor. The computing means 38, in turn, responds to instruction along a line 40, from a sensor 42 attached to the secondary mirror 22.

Individual details on the assembly 20 components are now provided, as a preliminary step to a disclosure of its operation.

The FIG. 2 optical element comprises a conventional secondary mirror 22. In other embodiments (not shown), the optical element may comprise a primary mirror, a petal of a segmented mirror, a conventional lens, or a diffraction grating.

The optical element 22 is connected to the lever arm 24 by way of the single conventional strut flexure 26. Although one strut flexure 26 is shown in FIG. 2, it is preferred to use six strut flexures, during an actual operation of the assembly, in order to position the secondary mirror 22 in six degrees of freedom. Preferred strut flexures comprise graphite/epoxy tubes.

The lever arm 24 has an effecting spring stiffness relative to the optical element (i.e., the spring stiffness measured at the juncture of the flexure 26 with the lever arm 24) of at least $2.0 \times 10^4$ pounds/inch, but less than $2.0 \times 10^6$ pounds/inch. These stiffness limitations are imposed because, within this window, the lever arm 24 can both realize and maintain a required fixed position, yet be suitably resilient for accommodating perturbations to the assembly 20.

A preferred lever arm 24 comprises Invar steel having an elastic modulus $E = 19 \times 10^6$ psi. Invar steel is preferred, not only because of its elastic modulus, but because of its low coefficient of thermal expansion. The lever arm 24 may also comprise, for example, carbon steel, having an elastic modulus $E = 30 \times 10^6$ psi, or nylon, having an elastic modulus $E = 0.4 \times 10^6$ psi.

The conventional static position actuator 30 can provide a positional input to the lever arm 24, by way of the actuator flexure 32. A required positional input may be derived by way of a conventional positional sensor means, not shown. A suitable static position actuator 30 is available from Plessey, Inc., model CU-09609191. The static position actuator 30 is typically a motor driven, lead-screw device. The operation of the static position actuator 30 serves to establish the static spatial position in a corresponding degree of freedom of the secondary mirror 22 which is desired to be maintained over the long term, independent of extraneous perturbations to the optical system 20 that effect short-term deviations from the desired long-term position. To this end, the static position actuator 30 and lever arm 24 preferably cooperate to provide a reduction in motion (e.g., 8:1) between the static position actuator 30 and strut flexure 26. This can be achieved, as shown in FIG. 2, by locating the respective junctures with lever arm 24 of the flexures 32 and 36, so that the length of the moment arm of flexure 32 about fulcrum 28 is considerably greater (viz., 8:1 times greater) than the length of the moment arm of flexure 26 about fulcrum 28. Such action can result in improved positioning precision, and decreased loads on the static position actuator 30. Note that in typical applications, an assembly may use a plurality of such static position actuators 30.

The pair of dynamic force actuators 34 may comprise conventional plastic piezoelectric devices, but preferably comprises conventional piezoceramic actuators. The piezoceramic actuators preferably comprise 1"×1.75"×0.020" dimensioned elements, with conductive plating on two sides, and which are bonded (e.g., glued) to the lever arm 24. Although FIG. 2 shows a pair of dynamic force actuators 34, it is noted that only one such device is required, and that a plurality of four or more devices may be desirable for some applications.

A voltage command along the line 36 to the dynamic force actuators 34, results in their expansion or contraction. This action, in turn, causes the lever arm 24 to elasticly bend, as shown in FIG. 3. The bending action of the lever arm 24 induces axial motion of the FIG. 2 strut flexure 26. Since the strut flexure 26 is connected to the secondary mirror 22, this last action, finally, induces a rigid body control comprising active damping of the secondary mirror 22.

In this way, therefore, the lever arm 24 is at once a unique medium for realizing positional control of the secondary mirror 22, by way of its mediating role between the position actuator 30, and the strut flexure 26 connected to the secondary mirror 22; and, a medium for realizing dynamic control of the secondary mirror 22, by way of its mediating role between the dynamic force actuators 34, and the strut flexure 26 connected to the secondary mirror 22.

As summarized above, the voltage command along the line 36 to the dynamic force actuator, emanates from the computing means 38. The computing means 38, it is recalled, responds, in a conventional manner, to instruction along the line 40 from the sensor 42. In particular, the sensor 42 preferably comprises a conventional accelerometer. Although the sensor 42 is shown in FIG. 2 as attached to the secondary mirror 22, note that it may be attached to some other assembly 20 component as, for example, to the strut flexure 26.

What is claimed is:

1. An assembly of an optical system, comprising:
a) an optical element
b) a support including a fulcrum;
c) a lever arm supported on the support and balanced by way of the fulcrum;
d) a flexure means for connecting the optical element to the lever arm at a first point spaced from the fulcrum;
e) a static position actuator, acting on the lever arm at a second point spaced from the fulcrum, for positioning the lever arm, to thereby position the optical element by way of the flexure means;
f) a sensor adapted and positioned for detecting positional perturbations experienced by the optical element;
g) a dynamic force actuator, cooperative with the sensor and acting on the lever arm at a third point spaced from the fulcrum and located intermediate the first and second points, for applying active damping forces to the lever arm in response to perturbations detected by the sensor, to thereby, by way of the flexure means, dampen perturbations to the optical element; and
h) a sensor and computing means responsive to perturbations to the optical element, and computing compensatory active damping forces for input to the dynamic force actuator.

2. An assembly according to claim 1, wherein the assembly further includes a primary mirror attached to the structure; and wherein the optical element comprises a secondary mirror.

3. An assembly according to claim 1, wherein the lever arm comprises a material having an effective spring stiffness within the range of greater than $2.0 \times 10^4$ pounds/inch to less than $2.0 \times 10^6$ pounds/inch.

4. In an assembly for the positional control of an optical element of an optical system; the assembly having a support including a fulcrum, a lever arm supported and balanced by way of the fulcrum, flexure means connecting the optical element of the lever arm at a first point spaced a first distance from the fulcrum, a static position actuator acting on the lever arm at a second point spaced a second distance from the fulcrum, the static position actuator cooperating with the flexure means and lever arm to establish a static spatial position of the optical element over the long term relative to the support, and the assembly further comprising means for dynamically controlling the position of the optical element relative to its established static spatial position to accommodate perturbations to the optical system so as to maintain the established static spatial position over the short term; the improvement comprising:

the assembly further including a sensor adapted and positioned for detecting positional perturbations experienced by the optical element;

the means for dynamically controlling the position of the optical element comprising at least one actuator cooperative with the sensor for applying, in response to the perturbations detected by the sensor, forces to the lever arm at a third point intermediate the first and second points and spaced a third distance from the fulcrum; and the lever arm being dimensioned, configured and adapted so that positioning of the optical element relative to the structure at any one time will be controlled, at least in part, by the combined moment effect on the first point of the static position actuator acting at the second point and the means for dynamically controlling the position acting at the third point.

5. An improvement as in claim 4, wherein the lever arm comprises a material having an effective spring stiffness within the range of greater than $2.0 \times 10^4$ pounds/inch to less than $2.0 \times 10^6$ pounds/inch.

6. An improvement as in claim 5 wherein the lever arm material further comprises a material having an elastic modulus within the range $E = 0.4 \times 10^6$ psi to $E = 30 \times 10^6$ psi.

7. An improvement as in claim 6 wherein the lever arm material further comprises a material having a low coefficient of thermal expansion.

8. An improvement as in claim 4, wherein the second distance is more than twice as great as the first distance.

9. An improvement as in claim 8, wherein the first and second points are located on opposite sides of the fulcrum.

10. An improvement as in claim 9, wherein the third point is located intermediate the second point and the fulcrum.

11. An improvement as in claim 4, wherein the means for dynamically controlling the position of the optical element comprises a piezoelectric device.

12. An improvement as in claim 11, wherein the sensor comprises an accelerometer attached to the optical element.

13. An improvement as in claim 11, wherein the flexure means comprises at least one graphite/epoxy tube.

14. An improvement as in claim 4, wherein the means for dynamically controlling the position of the optical element comprises a piezoceramic actuator bonded to the lever arm.

15. An assembly for the positional control of an optical element of an optical system, comprising:
   a support including a fulcrum;
   a lever arm supported on the support and balanced by way of the fulcrum;
   a first flexure connecting the optical element to the lever arm at a first point spaced a first distance from the fulcrum;
   a static position actuator;
   a second flexure connecting the static position actuator to the lever arm at a second point spaced a second distance from the fulcrum; the static position actuator cooperating with the flexures and lever arm to establish a static spatial position of the optical element over the long term relative to the support;
   a sensor adapted and positioned for detecting positional perturbations experienced by the optical element; and
   a dynamic positional control actuator connected to the sensor and adapted and positioned for applying forces, in response to the perturbations detected by the sensor, to the lever arm at a third point intermediate the first and second points and spaced a third distance from the fulcrum;
   the lever arm being configured so that positioning of the optical element relative to the structure at any one time will be controlled, at least in part, by the combined moment effect on the first point of the static position actuator acting at the second point and the dynamic positional control actuator acting at the third point.

16. An assembly as in claim 15, wherein the lever arm has an effective spring stiffness within the range of $2.0 \times 10^4$ pounds/inch to less than $2.0 \times 10^6$ pounds/inch.

17. An assembly as in claim 16, wherein the second distance is more than twice as great as the first distance.

18. An assembly as in claim 17, wherein the lever arm material further comprises a material having an elastic modulus within the range $E = 0.4 \times 10^6$ psi to $E = 30 \times 10^6$ psi.

19. An assembly as in claim 18, wherein the lever arm material further comprises a material having a low coefficient of thermal expansion.

20. An assembly as in claim 16, wherein the dynamic control actuator comprises a piezoceramic actuator bonded to the lever arm.

* * * * *